Aug. 9, 1932.  W. J. ROEPKE  1,870,295
PLAITED CORNER FOLD PAN AND THE ART OF AND BLANK FOR MAKING THE SAME
Original Filed Feb. 17, 1926
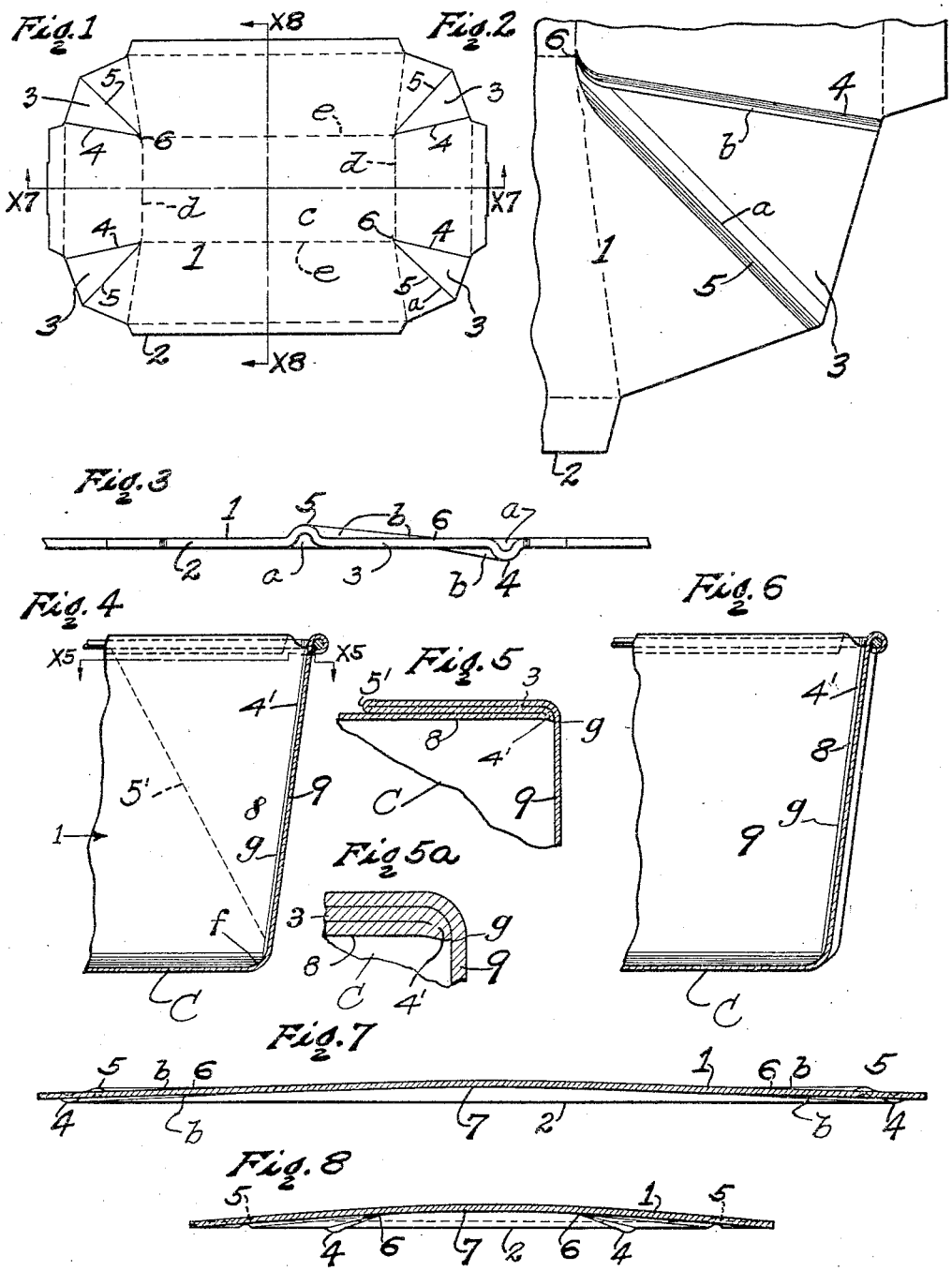
WITNESS:
J. A. McDowell
INVENTOR
WILLIAM JOHN ROEPKE
by James R. Townsend
his Atty.

Patented Aug. 9, 1932

1,870,295

UNITED STATES PATENT OFFICE

WILLIAM JOHN ROEPKE, OF DAYTON, OHIO, ASSIGNOR, BY MESNE ASSIGNMENTS, TO ROEPKE CONTAINER CORPORATION, OF BALTIMORE, MARYLAND, A CORPORATION OF MARYLAND

PLAITED CORNER-FOLD PAN AND THE ART OF AND BLANK FOR MAKING THE SAME

Application filed February 17, 1926, Serial No. 88,834. Renewed December 29, 1931.

An object of this discovery and invention is to make provision whereby plaited corner-fold pans of slight draw having their walls connected to the pan bottom by a direct bend, and with smooth regularly shaped corners, can be produced by a folding process more rapidly, with minimum strain on the stock, and with expenditure of less power, than is possible by the cupping, pressing, stretching or drawing processes. An object is to reinforce the points or corners of the pan where the walls and bottom meet.

This invention is applicable to the manufacture of sheet metal pans made from blanks having notched corners and adapted to be folded by mechanical folding means to form a receptacle rectangular in plan, such as are customarily used for baking loaves of bread and cake, and which may be put to many other uses. It is desirable that such pans shall have smooth rounded corners at the junctures of the bottom and walls of the pan, and that the inside surface of the pan shall be devoid of crevices in which grease or other matter may lodge, and that the cavity shall be such as to give a practically flat form end to the loaf molded therein.

A defect found in producing folded sheet metal pans by mechanical folding means, is that the sheet metal is likely to wrinkle at the corners and in the walls of the pan, and does not exactly fit the form onto which the sheet is bent; and an object is to rapidly produce pans having folded corners without the stated defect.

Heretofore it has been proposed that at the same time or after the blank is cut, a rectangular shaped depression be drawn or pressed downwardly in the center by suitable dies, and that rounded concavo-convex corners be formed by the die or dies used to make the depression.

Pans of the character stated are customarily formed from blanks, the corners of which are notched at angles calculated to bring the edges of the sheet at the ends of the corner-fold plaits to approximately the level of the rim of the pan formed by folding the plaits upon each other and against the walls of the pan. These plaits are usually folded against the end walls of the pan, but it is immaterial whether they are folded upon the end walls or the side walls.

A problem arises in the manufacture of such pans in that it is difficult to so finish the inside corners that they will be free from grooves, creases and crevices.

An object of this invention is to avoid the presence of grooves, creases, wrinkles and crevices at the inside corners of the pan between the edges of the plaits and the walls of the pan and to do this without drawing the metal or forcing any depression in the blank; and the invention is broadly new, basic and pioneer in that each of the inside folds terminates a wall from pan bottom to top in a narrow reinforcing bead abutting the adjacent pan wall; and such bead is formed by creasing a flat blank on one face to form a rib on the other face and vice versa with the opposite faces, and then bending the blank at the creases in the process of forming the pan, and finally swaging the inside bend to form a thin edge or rib against the inside of an opposing pan wall.

It is thus possible to produce corner-fold pans at much less cost than partially or wholly drawn pans and an object of this invention is to produce in a corner-fold pan, an inside finish from the bottom of the pan to the top of its wall approximately that of drawn pans.

An object is to facilitate the folding operation and to maximize the precision of the fold; and to this end I form at the corners of the blank imprints having converging margins one of which is in the form of a groove on one face and a rib on the other face of the blank, and the other of which margins is in the form of a groove on such other face and a rib on the first mentioned face; and the intermediate portion of each imprint extends in a plane oblique to the plane of the body of the blank so that in the folding operation a definite direction is given to the imprint at the beginning of the folding operation, thereby insuring that the folding mechanism of the pan-making machine will cause the blank to fold properly.

I have discovered that by outlining a plait at each corner of the blank by an imprint that extends in a plane oblique to the plane of the blank, and that has the reversely arranged converging grooves, and ribs and then folding the sheet onto the form, the imprinted plaits fold regularly and the pan is formed without crinkling.

The form of the plaits thus imprinted is practically triangular, and in the operation of imprinting the plait, the converging edges of the imprint are in the form of reversely arranged creases, one of said creases forming a groove on one face and a rib on the other face of the blank; and vice versa, the other of said creases forming a rib on the first mentioned face and a groove on the other face so that the ridge and groove formed by one crease is reverse to the groove and ridge formed by the other crease.

The length and the angle of convergence of the edges of the imprint may vary, depending upon the flare and depth predetermined for the completed pan.

A further object is to avoid adhesion between the blanks when supplied in bunches to the magazine of a pan making machine, so that single blanks can be removed from the bunch instantly by suction cups for delivery to other mechanism and this object is attained by the reverse formation of the said ribs projecting from the opposite faces of the blanks, respectively and which serve to separate the contiguous faces of the blanks in the bunch, and by imprinting the blank and outlining a plait at each corner with the grooves and ribs, I produce the moderately arcuate concavo-convex form to assist in avoiding suction between the contiguous faces of blanks when stacked in a bunch and put into the magazine of a pan making machine.

By imprinting the blanks to cause them to promptly bend to form the reversely arranged creases and ribs I avoid the necessity of drawing the metal at the margins of the pan bottom and establish a close joint at the corners, and since there is no wear upon the sharp bends of the sheet in the completed pan, the creasing does not affect the lasting qualities of the pan.

Other objects, advantages and features of invention may appear from the accompanying drawing, the subjoined detailed description and the appended claims.

The accompanying drawing illustrates the invention.

Figure 1 is a face view of a blank having imprinted plaits at its corners in accordance with this discovery and invention. The face shown in this view is that which is uppermost during the process of folding, and undermost when the pan is completed and turned with open side up.

Fig. 2 is an enlarged fragmental detail of the face of one of the corners of the blank shown in Fig. 1.

Fig. 3 is an edge view of the blank corner shown in Fig. 2.

Fig. 4 is an enlarged fragmental detail of the inside of a corner of the completed pan. The undermost and outermost surface of the pan is the surface seen in Fig. 1.

Fig. 5 is a fragmental detail of a corner of the improved pan in section on line $x5$, Fig. 4.

Fig. 5a is an enlarged fragmental detail in section showing the beaded formation of one of the corners of the folded pan.

Fig. 6 is an enlarged fragmental detail of the inside of a corner opposite to the corner of the pan shown in Fig. 4.

Fig. 7 is an enlarged and exaggerated elevation partly in section on line $x7$, Fig. 1.

Fig. 8 is an enlarged elevation partly in section on line $x8$, Fig. 1.

In Figures 1, 2 and 3, the bottom side of the blank is the side intended to fit upon the form, not shown, onto which the blank is to be folded by folding mechanism not shown.

1 indicates the body of the sheet in the blank and also in the pan. 2 indicates margins of the body, the edges of which may be rolled over the rim wire in completing the pan to be folded from said blank. 3 indicates the imprinted plaits at the corners of the blank, each of said plaits extending oblique to the plane of the blank between the reversed converging edges 4, 5 of the plait; the edge 4 of the imprint extending beyond one face, and the edge 5 of said imprint extending beyond the other face, of the blank; the edge 4 being terminated on one face of the blank by a crease $a$ and the edge 5 being terminated on said face of the blank by a ridge or rib $b$ and vice versa for the other side; the metal forced out by the crease at one edge of the imprint in one face of the blank forming a rib on the other face of the blank, and vice versa, the metal forced out by each crease in one face of the blank and edge of the imprint, form a rib on the other face of the blank at said edge of the imprint; and the converging creases and ridges on each side of the respective imprints may or may not merge into each other to form a curved vertex 6.

7 indicates an arcuate concavo-convex central portion of the imprinted creased and ribbed blank, and by the operation of imprinting, creasing and ridging the sheet I produce the arcuate concavo-convex form which is shown exaggerated in Figs. 7 and 8.

4′ indicates the compressed narrow-beaded or thin ribbed straight edges of the plaits 3, which are adapted to be, and in the completed pan are, fitted against the walls 8 or 9 so as to practically do away with corner crevices and yet to preserve practically flat end walls for molding the ends of the loaves.

In practice the blank is preferably a stamping cut and formed at a single stroke by male and female dies not shown, and the stamping thus formed comes from the dies dished as shown and this affords take-up of metal at the creases and ridges where the inner and outer edges are formed as at 4' and 5'.

The radius of each ridge is greater than the radius of a crease, so that the blanks in a stack or bunch are invariably spaced apart by the ribs and are not liable to be held together by adhesion.

No attempt is made in the drawing to show the intermediate stages of the bending that closes the creases and finally results in forming the practically thin narrow flattened rib 8 which may be more or less minute depending upon the force of such folding flaps or other swaging means, not shown, as may be used to fold and swage the blank onto the form to complete the pan.

The ribs are symmetrically arranged around and at the corners of a rectangular surface $c$ the boundaries of which are indicated by dotted lines at $d$ and $e$ in Fig. 1, and said rectangular surface constitutes the pan bottom as at $c$ in Figs. 4, 5, 5a and 6.

It is thus seen that I have produced a sheet metal pan having practically flat loaf molding walls joined to each other practically at right angles throughout from bottom to top of the pan and have avoided the necessity of drawing any part of the blank to maintain a union between the walls and bottom.

Referring more particularly to the drawing, I have shown a pan comprising a metal sheet 1 having a margin 2, forming the pan walls as at 8 and 9, and provided in such margin with four sets of reverse bends forming ribs 4', 5', symmetrically arranged outside the corners of a rectangular figure $c$, which is bounded by the ends and sides $d, d, e, e$; such figure forming the bottom $c$ of the pan; said sheet being bent at the junctions of the walls 8 or 9 and such rectangular figure as at $f$, and formed into plaits having compressed narrow beaded or thin ribbed straight edges $g$ fitted against the walls 8, 9, of the completed pan so as to practically do away with corner crevices and yet preserving practically flat end walls 8 for molding the walls of loaves; each of the flattened edges $g$ of said ribs, respectively fitting against the inside face of an adjacent wall of the pan.

I claim:

1. The method of making a plaited corner-fold pan which consists in forming at the corners of a blank to be folded, imprints of triangular form having margins that converge inwardly from the edge of the blank; forming margins of each imprint as a groove on one face of the blank and thereby forming a thin rib on the other face of the blank; then bending the wall forming portions and the plaits of the blank onto a form with bends of the blank at the grooves thus causing the ribs to form straight edges for the plaits to fit against the walls adjacent thereof.

2. A blank for forming a folded corner pan; in which the corners are respectively provided with an imprint adapted to form a plait having converging margins, one of which margins is a groove in one, and a thin rib on the other face of the blank and the other of which margins is a thin rib on the one face and a groove on said other face of the blank, so that when the blank is folded over a form to make a pan, the folding of the plaits will occur at the edges of the imprint thereby forming a straight edge for each of the plaits to fit on the inside of the pan to abut tightly against the wall adjacent such edge.

3. A blank for forming a folded corner pan; in which the corners are respectively provided with an imprint adapted to form a plait having converging margins, one of which margins is a groove in one, and a thin rib on the other face of the blank and the other of which margins is a thin rib on the one face and a groove on said other face of the blank, the imprint between said margins being in a plane oblique to the plane of the main body of the blank to give direction to the plait at the beginning of the folding operation.

4. A blank for forming a folded corner pan in which the corners are respectively provided with an imprint adapted to form a plait having converging margins, one of which margins is a groove in one, and a thin rib on the other face of the blank and the other of which margins is a thin rib on the one face and a groove on said other face of the blank, said blank being centrally concave to minimize adhesion of the blanks when in a bunch, so that the blanks may be easily separated for feeding to a folding mechanism.

5. A blank for forming a pan, said blank having corners imprinted to provide plaits having converging margins, one of which margins is in the form of a groove on one face of the blank, and forming plait margins comprising a thin rib and a groove on the opposite faces of said blank; the imprinting of said grooves and ribs causing the blank to be disposed in an arcuate concavo-convex form that assist in avoiding suction between the confronting surfaces of the blanks when the latter are stacked.

6. A blank for forming a pan having corners imprinted to provide plaits having inwardly converging margins, one of which is defined by a groove, and a thin rib defining the other margin of the plait on one face of the blank, and forming plait margins comprising a thin rib and a groove on the opposite face of said blank; the said grooves and ribs functioning to cause said blank to assume an arcuate concavo-convex form that assists in avoiding suction between the confronting surfaces of the blank when the latter are stacked and one blank is drawn from the other.

7. A pan comprising a metal sheet having a margin forming the pan walls, and provided in such margin with four sets of reverse bends forming ribs symmetrically arranged outside the corners of a rectangular figure; such figure forming the bottom of the pan; said sheet being bent at the junctions of the walls and such rectangular figure, and formed into plaits having compressed narrow beaded or thin ribbed straight edges fitted against the walls of the completed pan so as to practically do away with the corner crevices, and yet preserving practically flat end walls for molding the walls of loaves; each of the flattened edges of said ribs respectively fitting against the inside face of an adjacent wall of the pan.

In testimony whereof, I have hereunto set my hand at Los Angeles, California, this 9th day of February, 1926.

WILLIAM JOHN ROEPKE.